United States Patent
Lunttila et al.

(10) Patent No.: US 10,530,553 B2
(45) Date of Patent: Jan. 7, 2020

(54) ENHANCED CARRIER AGGREGATION IN COMMUNICATIONS

(71) Applicant: Nokia Solutions and Networks Oy, Espoo (FI)

(72) Inventors: Timo Erkki Lunttila, Espoo (FI); Esa Tapani Tiirola, Kempele (FI); Kari Juhani Hooli, Oulu (FI); Klaus Hugl, Vienna (AT)

(73) Assignee: Nokia Solutions and Networks Oy, Espoo (FI)

( * ) Notice: Subject to any disclaimer, the term of this patent is extended or adjusted under 35 U.S.C. 154(b) by 248 days.

(21) Appl. No.: 15/565,000

(22) PCT Filed: Apr. 10, 2015

(86) PCT No.: PCT/EP2015/057864
§ 371 (c)(1),
(2) Date: Oct. 6, 2017

(87) PCT Pub. No.: WO2016/162090
PCT Pub. Date: Oct. 13, 2016

(65) Prior Publication Data
US 2018/0102892 A1    Apr. 12, 2018

(51) Int. Cl.
| | |
|---|---|
| *H04L 5/00* | (2006.01) |
| *H04L 1/16* | (2006.01) |
| *H04L 1/18* | (2006.01) |
| *H04L 1/12* | (2006.01) |
| *H04W 72/04* | (2009.01) |

(52) U.S. Cl.
CPC .......... *H04L 5/0055* (2013.01); *H04L 1/1607* (2013.01); *H04L 1/1812* (2013.01);
(Continued)

(58) Field of Classification Search
CPC ... H04L 5/0055; H04L 1/1607; H04L 1/1822; H04L 1/1825; H04L 1/1861; H04L 5/001;
(Continued)

(56) References Cited

U.S. PATENT DOCUMENTS

| | | | | |
|---|---|---|---|---|
| 2011/0116457 | A1* | 5/2011 | Damnjanovic | H04L 1/1854 370/329 |
| 2011/0128922 | A1* | 6/2011 | Chen | H04L 5/0007 370/329 |

(Continued)

FOREIGN PATENT DOCUMENTS

| | | |
|---|---|---|
| WO | 2016/116165 A1 | 7/2016 |
| WO | 2016/162791 A1 | 10/2016 |

OTHER PUBLICATIONS

"New WI proposal: LTE Carrier Aggregation Enhancement Beyond 5 Carriers", 3GPP TSG-RAN meeting #66, RP-142286, Agenda: 14.1.1, Nokia Corporation, Dec. 8-11, 2014, 9 pages.

(Continued)

*Primary Examiner* — Kibrom T Hailu
(74) *Attorney, Agent, or Firm* — Harrington & Smith

(57) ABSTRACT

A method comprises defining (401), in a network node (e NB), scheduled downlink carriers from a list of configured downlink carriers. The network node (e NB) defines (401) a downlink assignment index of the scheduled carrier having at least the lowest carrier index from the list of configured carriers, based on a total number of scheduled carriers. The network node (e NB) defines (401) the downlink assignment index for each other scheduled carrier having a higher carrier index from the list of configured carriers. The network node (e NB) transmits (402) to a terminal device (UE) a control message corresponding to each scheduled carrier, the control message indicating a downlink assignment scheduling a physical downlink shared channel, and comprising the defined downlink assignment index. The network (Continued)

node (e NB) receives (405) from the terminal device (UE), uplink control signalling indicating HARQ-ACKs related to physical downlink shared channels corresponding to the scheduled carriers.

18 Claims, 7 Drawing Sheets

(52) U.S. Cl.
CPC .......... *H04L 1/1822* (2013.01); *H04L 1/1825* (2013.01); *H04L 1/1861* (2013.01); *H04L 2001/125* (2013.01); *H04W 72/0446* (2013.01)

(58) Field of Classification Search
CPC .. H04L 5/14; H04W 72/0446; H04W 52/146; H04W 52/143; H04W 72/04
See application file for complete search history.

(56) References Cited

U.S. PATENT DOCUMENTS

| | | | | |
|---|---|---|---|---|
| 2015/0092693 A1* | 4/2015 | Fu | ........................... | H04L 5/001 370/329 |
| 2015/0131494 A1* | 5/2015 | He | ........................ | H04B 7/0469 370/280 |
| 2015/0200751 A1* | 7/2015 | Yin | ........................ | H04L 1/1887 370/280 |

OTHER PUBLICATIONS

"PUCCH Enhancements for Carrier Aggregation Enhancement Beyond 5 Carriers", 3GPP TSG-RAN Working Group 1 meeting #80, R1-150454, Agenda: 7.2.2.2.3, Nokia Networks, Feb. 9-13, 2015, 5 pages.

"Observations on Necessary Enhancements to UL Control Signaling", 3GPP TSG-RAN Working Group 1 meeting #80, R1-150825, Agenda: 7.2.2.2.1, Nokia Networks, Feb. 9-13, 2015, 6 pages.

"3rd Generation Partnership Project; Technical Specification Group Radio Access Network; Evolved Universal Terrestrial Radio Access (E-UTRA); Base Station (BS) radio transmission and reception (Release 12)", 3GPP TS 36.104, V12.6.0, Dec. 2014, pp. 1-155.

International Search Report and Written Opinion received for corresponding Patent Cooperation Treaty Application No. PCT/EP2015/057864, dated Nov. 20, 2015, 10 pages.

* cited by examiner

DAI of Scheduled carriers

HARQ-Ack of cell

DAI of Scheduled carriers

HARQ-Ack of cell

| | FDD | TDD Pcell | | | | | | | | | | | | |
|---|---|---|---|---|---|---|---|---|---|---|---|---|---|---|
| | | UL/DL config. #0 | | UL/DL config. #1 | | UL/DL config. #2 | | UL/DL config. #3 | | UL/DL config. #4 | | UL/DL config. #5 | | UL/DL config. #6 |
| | | TDD CA | TDD-FDD CA | TDD CA | TDD-FDD CA | TDD CA | TDD-FDD CA | TDD CA | TDD-FDD CA | TDD CA | TDD-FDD CA | TDD CA | TDD-FDD CA | TDD CA | TDD-FDD CA |
| Maximum number of HARQ-ACK bits per subframe for 32 CCs, spatial bundling | 32 | 32 | 63 | 64 | 95 | 128 | 159 | 96 | 189 | 128 | 190 | 288 | 319 | 32 | 94 |

*Fig. 11*

ENHANCED CARRIER AGGREGATION IN COMMUNICATIONS

RELATED APPLICATION

This application was originally filed as PCT Application No. PCT/EP2015/057864 filed Apr. 10, 2015.

TECHNICAL FIELD

The invention relates to communications.

BACKGROUND

Radio communication systems such as 3GPP LTE may apply HARQ in order to improve communication link reliability and performance. In general, HARQ feedback is necessary for a HARQ operation. For a downlink HARQ operation, the HARQ feedback to the network, access point or base station is an ACK if the terminal device recognized data intended for it on a downlink shared channel (PDSCH) and the terminal device did not detect any transmission error on the PDSCH data. It is a NACK if the terminal device recognized data intended for it on the downlink shared channel (PDSCH) but the terminal device detected a transmission error on the PDSCH data. The terminal device may send the HARQ feedback to the network, access point or base station in an uplink direction on PUCCH or PUSCH, depending on which channel is currently available at a sub-frame.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which

FIG. 11 illustrates maximum number of HARQ-ACK feedback bits per sub-frame.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
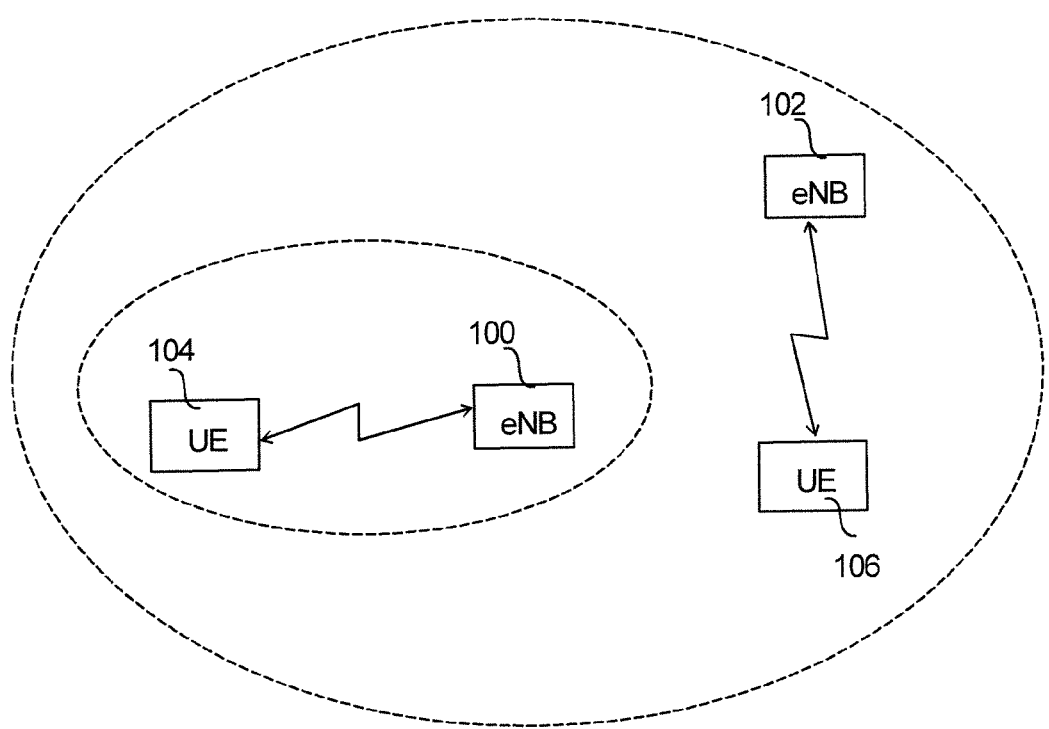
FIG. 1 illustrates a wireless communication system to which embodiments of the invention may be applied.

FIG. 1 illustrates a wireless communication scenario to which embodiments of the invention may be applied. Referring to FIG. 1, a cellular communication system may comprise a radio access network comprising base stations disposed to provide radio coverage in a determined geographical area. The base stations may comprise macro cell base stations 102 arranged to provide terminal devices 106 with the radio coverage over a relatively large area spanning even over several square miles, for example. In densely populated hotspots where improved capacity is required, small area cell base stations 100 may be deployed to provide terminal devices 104 with high data rate services. Such small area cell base stations may be called micro cell base stations, pico cell base stations, or femto cell base stations. The small area cell base stations typically have significantly smaller coverage area than the macro base stations 102. For carrier aggregation, a terminal device in a small area cell may be connected both to a small area cell base station and to a macro cell base station. The cellular communication system may operate according to specifications of the $3^{rd}$ generation partnership project (3GPP) long-term evolution (LTE) advanced or its evolution version.

Mechanisms to enable LTE carrier aggregation (CA) of up to 32 component carriers for downlink (DL) and uplink (UL) are about to increase the amount of HARQ-ACK feedback considerably compared to Rel-12 situation where the maximum number of UL and DL component carriers is only 5. This is illustrated in FIG. 11 which shows the maximum number of HARQ-ACK feedback bits per sub-frame for 32-carrier FDD CA, TDD CA and TDD-FDD CA, assuming spatial bundling is applied on each carrier. In the case of TDD CA, the same UL/DL configuration is assumed for each carrier to simplify the presentation. In the case of TDD-FDD CA, the cell carrying PUCCH (PCell in at least up to LTE Rel-12) are assumed to be TDD carriers with a certain UL/DL configuration, while the other carriers are assumed to be FDD. Spatial bundling for SU-MIMC spatial multiplexing is performed using a logical AND operation. An acknowledgement (ACK) is fed back only if HARQ-ACK corresponding to both transport blocks of the SU-MIMO transmission is a positive ACK. If either TB is received incorrectly, a negative ACK (NACK) is reported. Spatial bundling is not applied in case of single stream PDSCH transmission.

For reducing the number of HARQ-ACK feedback bits associated with non-scheduled serving cells/sub-frames, dynamic HARQ-ACK codebook size (HARQ-ACK payload size) adaptation is needed.

Since Rel-10, the LTE carrier aggregation has assumed that the HARQ-ACK feedback is provided for each of the configured carriers when sent on PUCCH, regardless of whether these carriers are actually scheduled, or even activated. The only exception is the case when UE receives a DL assignment only for PCell; in such case the HARQ-ACK feedback is provided for PCell only using PUCCH format 1a/b.

Thus UL overhead due to the HARQ-ACK signalling is maximized every time, even if eNB chooses to schedule e.g. one (SCell) or two cells at the time. Up to LTE Rel-12, the number of supported component carriers for LTE carrier aggregation is limited to 5 from specifications point of view. However, in Rel-13 the number of aggregated carriers is expected to increase up to 32. Such a large number of component carriers also means a large HARQ-ACK overhead. On the other hand, it is still likely that eNB does not simultaneously schedule (even nearly) each of the component carriers at the same time. This highlights the need for enhancing the efficiency of HARQ-ACK resource usage.

Downlink assignments (also referred to as downlink resource allocation grants) for a single UE are separately encoded for each component carrier (CC) and sub-frame. This means that error cases related to different CCs as well as sub-frames of each CC are independent. A failure in the reception of the DL assignment results in discontinuous transmission (DTX) of HARQ-ACK per CC and per sub-frame from the UE point of view.

Figure 2:
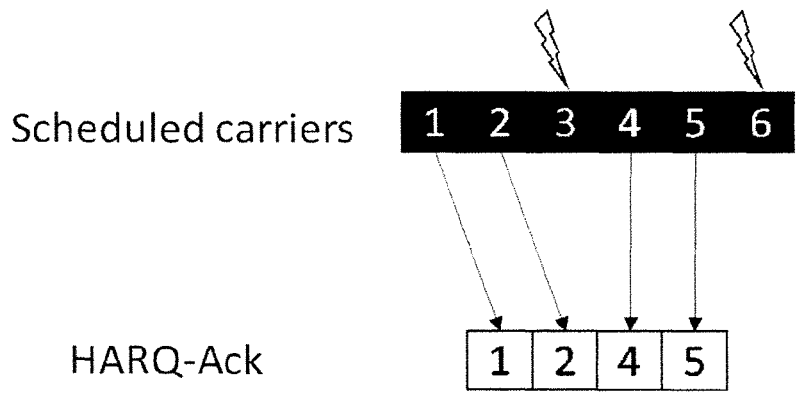
FIG. 2 illustrates issuing of HARQ-ACK feedback in case of missed DL assignments.

In case the number of HARQ-ACK bits to be fed back to eNB were only defined by the number of received DL assignments when the reception of the DL assignment scheduling PDSCH fails, ACK/NACK(s) associated with this PDSCH would be missing from the corresponding UL sub-frame because UE has missed the DL assignment and therefore has no reason to include ACK/NACK for the failed DL assignment. A single missed DL assignment in that respect has two effects: 1) the total number of HARQ-ACK bits fed back is different (resulting in a wrong size of the HARQ-ACK bits container), and 2) in addition, the HARQ-ACK bits are fed back at wrong positions. FIG. 2 illustrates the issuing of the HARQ-ACK feedback in case of missed DL assignments. As can be seen from the exemplary situation of FIG. 2, UE fails to receive the DL assignment of the 3rd and 6th scheduled carrier. As a consequence, UE only feeds back HARQ-ACK of 4 carriers. Therefore, the HARQ-ACK codebook size is too small, namely 4 carriers instead of 6 carriers in the exemplary situation of FIG. 2. Moreover, even if eNB were able to find out the HARQ-ACK codebook size, there would still be an uncertainty for which of the 6 carriers HARQ-ACK actually has been fed back (for example, [1 2 4 5] as shown in FIG. 2—or any other combination, such as [2 3 4 6]).

In the current carrier aggregation framework, HARQ-ACK is reported for each of the carriers, regardless of whether they are scheduled or not. For the carriers for which UE does not detect a DL assignment, UE simply feeds back NACK. Therefore, an incorrect reception of a PDSCH transport block (NACK) is not distinguished from DTX (UE not receiving a PDCCH DL assignment at all).

When considering dynamic HARQ-ACK feedback or HARQ-ACK codebook size adaptation against given performance requirements, eNB needs a correct understanding about the HARQ-ACK codebook size (the number of ACK/NACK bits) that UE assumes for the jointly coded packet containing HARQ-ACKs for given set of CCs/sub-frames as well as the correct positions of HARQ-ACKs within a HARQ-ACK container.

3GPP LTE specifications define eNB receiver demodulation performance requirements for DTX to ACK error probability as follows. A DTX to ACK probability, i.e. a probability that ACK is detected when nothing is sent, is not to exceed 1%. Also requirements for NACK to ACK error probability as well as HARQ-ACK missed detection probability are defined. The NACK to ACK detection probability is the probability of an ACK bit being falsely detected when an NACK bit is sent on a particular bit position. The NACK to ACK probability is not to exceed 0.1%. ACK missed detection probability is the probability of not detecting the ACK bit when the ACK bit is sent on the particular channel (or bit position). The ACK missed detection probability is not to exceed 1%. Besides these values, a target quality for DL assignment missed detection at the UE side is set to be 1%.

Dynamic codebook size adaptation may be based on predefined uplink control information (UCI) configurations/profiles, where certain UCI configuration is triggered by means of ACK/NACK resource index (ARI) bits. A UCI configuration may indicate e.g. the PUCCH format to be used and hence also the number of payload bits (i.e. the HARQ-ACK codebook size). However, room for the codebook size adaptation is limited to a reasonable number of ARI bits. This is the case especially with TDD PCell and a large number of configured component carriers.

UL/DL downlink assignment index (DAI) bits may be used in TD-LTE, wherein a 2-bit DAI is included in each DL assignment. DAI is a counter counting the number of dynamically scheduled PDSCHs (i.e. PDSCH with corresponding PDCCH). DL DAI for TDD facilitates DL assignment reception error handling with time-domain HARQ-ACK bundling. The time-domain (HARQ-ACK) bundling is performed in time-domain across sub-frames (in contrast to spatial bundling explained earlier). ACK is fed back only if HARQ-ACK corresponding to each of the sub-frames within the scheduling window have ACK. If TB in either sub-frame is received incorrectly, NACK is reported. A 2-bit downlink assignment index is included in each DL grant indicating the total number of semi-persistently or dynamically scheduled PDSCHs (PDSCHs with and without corresponding PDCCH). Hence, it facilitates dynamic codebook size adaptation when HARQ-ACK is multiplexed with UL-SCH data on PUSCH.

Figure 3:
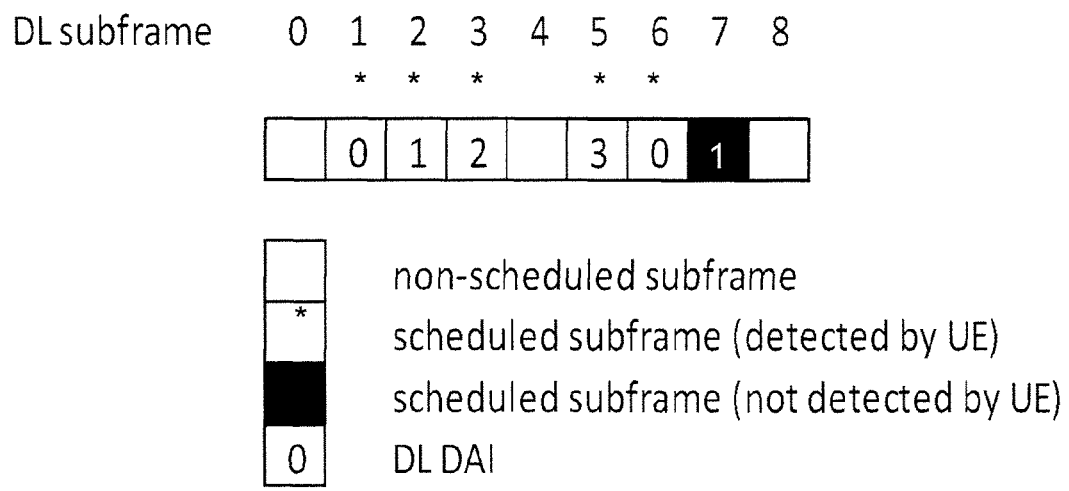
FIG. 3 illustrates exemplary downlink assignment operation.

Exemplary DL-DAI operation in the case of HARQ-ACK bundling/PUCCH for Rel-12 TD-LTE operation is illustrated in FIG. 3 where a TDD configuration #5 is considered. There are 9 sub-frames with potential PDSCH allocation in the bundling window. The bundling window in FIG. 3 illustrates 9 sub-frames potentially creating PDSCH HARQ-ACK in an UL sub-frame; hence, it does not illustrate frame structure type 2 as such. eNB schedules PDSCH with DL assignments for 6 sub-frames (1, 2, 3, 5, 6, 7) within the bundling window. UE detects the DL assignment for the first five of these 6 scheduled sub-frames. The DL assignment for the last scheduled sub-frame is not detected by UE, and this is considered an error case. UE sends a bundled HARQ-ACK using a HARQ-ACK resource corresponding to the position (index of the lowest control channel element) of the DL assignment of sub-frame #6 via HARQ-ACK resource corresponding to the last received DL grant. For error case handling, UE is able to determine, based on the DL-DAI bits, that first five DL grants were detected correctly as UE received DL grants on PDCCH or EPDCCH with continuous DL-DAI values [0, 1, 2, 3, 0, 1] based on the number of DAI bits to be limited to 2. eNB is able to determine, for example, based on blind detection that HARQ-ACK is transmitted via a resource corresponding to sub-frame #6 (instead of a resource corresponding to #7). This is possible in the considered HARQ-ACK bundling scenario involving a dedicated HARQ-ACK resource for each DL grant.

Existing solutions defined for TD-LTE are not able to provide dynamic HARQ-ACK codebook size adaptation for both PUCCH and PUSCH since it is not possible to guarantee that eNB has every time a correct understanding about the number of encoded HARQ-ACK bits. For example, UL-DAI in PUSCH grant is not available with PUCCH, since PUCCH is only used when PUSCH is not transmitted (and hence the UL grant is not available). Existing DL-DAI solution is not robust enough to handle scenario with last grant failure(s) potentially occurring on each carrier in the case of up to 32 CCs, where joint coding for HARQ-ACK bits is applied without any additional information provided by UE (such as resource selection).

Figure 4:
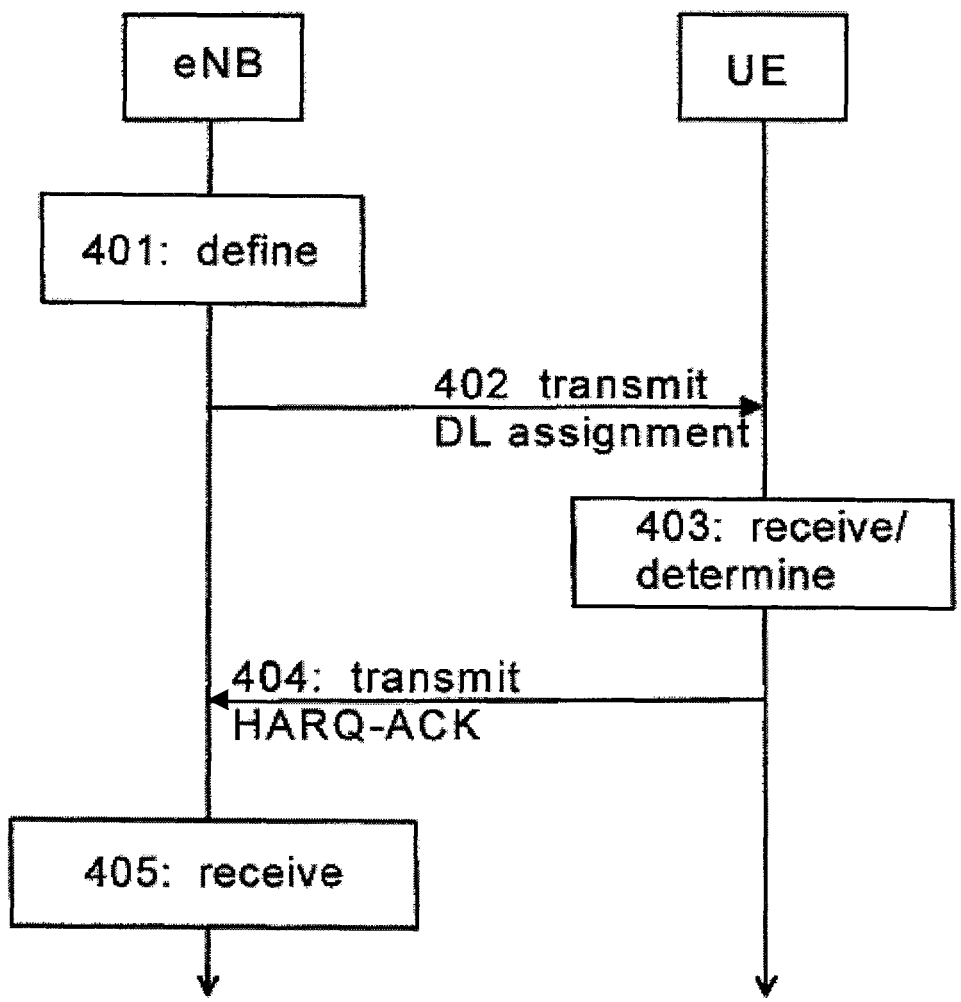
FIG. 4 illustrates a signalling diagram of a procedure for downlink assignment and HARQ-ACK feedback according to an embodiment of the invention.

Let us now describe an embodiment of the invention for selecting and signalling DL assignment and HARQ-ACK parameters with reference to FIG. 4. FIG. 4 illustrates a signalling diagram illustrating a method for signalling DL assignment and HARQ-ACK parameters between a base station eNB of a cellular communication system, e.g. base station 100 or 102, and a terminal device UE of the cellular communication system, e.g. the terminal device 104 or 106. In another embodiment, the procedure of FIG. 4 may be carried out between the terminal device and an access node or, more generally, a network node. The network node may be a server computer or a host computer. For example, the server computer or the host computer may generate a virtual network through which the host computer communicates with the terminal device. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. Virtual networking may also be used for testing the terminal device.

Referring to FIG. 4, the network node defines (block 401) scheduled downlink carriers from a list of configured downlink carriers. The network node further defines (block 401) a downlink assignment index of the scheduled carrier having at least the lowest carrier index from the list of configured DL carriers, based on a total number of scheduled carriers. The network node also defines (block 401) the downlink assignment index for each other scheduled carrier having a higher carrier index from the list of configured DL carriers. Based on the defining, for each scheduled carrier, the network node causes transmission to the terminal device of a control message (step 402) corresponding to each scheduled carrier, the control message indicating a physical downlink control channel (or enhanced physical downlink control channel) downlink assignment scheduling a physical downlink shared channel, and comprising at least one information element indicating the defined downlink assignment index. At the same time, for each scheduled carrier, the network node also causes transmission (step 402) of information on the physical downlink shared channel. The terminal device receives (block 403) from the network node, the physical downlink control channel (or enhanced physical downlink control channel) downlink assignment/assignments, each scheduling a physical downlink shared channel. Responsive to the receiving, the terminal device determines (block 403) the number of scheduled carriers based on the downlink assignment indexes of the received downlink assignments. The terminal device also determines (block 403) a HARQ-ACK codebook size based on the determined number of scheduled carriers. The terminal device further determines (block 403) resources for conveying a HARQ-ACK message. Based on the determining, the terminal device causes (step 404) transmission of a control message to the network node, the control message comprising at least one information element indicating HARQ-ACKs related to the physical downlink shared channels corresponding to the scheduled carriers. The network node receives (block 405) from the terminal device the uplink control signalling indicating HARQ-ACKs related to the physical downlink shared channels corresponding to the scheduled carriers.

An embodiment relates to LTE carrier aggregation enhancements in beyond-5G component carriers including the support for PUCCH on SCell, as part of 3GPP LTE Rel-13. HARQ-ACK feedback enhancements are provided in UL (acknowledgements corresponding to PDSCH transport blocks) in order to facilitate efficient operation with a high number of DL component carriers.

An embodiment proposes dynamic adjustment of HARQ-ACK feedback applicable for both FDD and TDD based carrier aggregation using DAI in the DL grant, as well as handling issues when one or more of the DL assignments is missed by UE.

In an embodiment, dynamic HARQ-ACK codebook adaptation uses DAI (downlink assignment index) also for FDD in the DL assignment in order to enable dynamic codebook adaptation. A specific DAI is used for carrier mapping to enable robust definition of the HARQ-ACK codebook size as well as a correct HARQ-ACK to UCI container (PUCCH/PUSCH) mapping. Robust handling of error cases related to missed reception of DL assignments is enabled.

An embodiment is compatible with the use of ARI for defining the ACK/NACK container size. Handling of an (E)PDCCH DL assignment failure related to last scheduled carrier (or carrier group(s)) is provided, including carrier grouping in order to reduce the probability of a wrong HARQ-ACK container size.

DAI is also included into DL assignments for FDD, and the DAI information is utilized for providing dynamic HARQ-ACK codebook size adaptation, and enabling the correct HARQ-ACK feedback bit mapping without the need to increase the DAI size excessively (from 2 bits) by taking the error case handling into account. Correct determination of the HARQ-ACK codebook size and bit ordering may be possible even if any single DL assignment is missed.

In an embodiment, a 2-bit component carrier (CC) specific DAI [0 . . . 3] is utilized. Some cycling of DAI from the scheduled carrier to the next may be used, for example, as illustrated in Table 1. This is similar to the TD-LTE solution, except that DAI is incremented in the carrier (i.e. frequency) domain, as opposed to time-domain.

TABLE 1

Cyclic DAI assignment in a frequency first manner.

|         | 1st | 2nd | 3rd | 4th | 5th | 6th | 7th | 8th |
|---------|-----|-----|-----|-----|-----|-----|-----|-----|
| 1 cell  | 0   |     |     |     |     |     |     |     |
| 2 cells | 0   | 1   |     |     |     |     |     |     |
| 3 cells | 0   | 1   | 2   |     |     |     |     |     |
| 4 cells | 0   | 1   | 2   | 3   |     |     |     |     |
| 5 cells | 0   | 1   | 2   | 3   | 0   |     |     |     |
| 6 cells | 0   | 1   | 2   | 3   | 0   | 1   |     |     |
| 7 cells | 0   | 1   | 2   | 3   | 0   | 1   | 2   |     |
| 8 cells | 0   | 1   | 2   | 3   | 0   | 1   | 2   | 3   |

The cyclic incrementing of DAI from one scheduled carrier to the next enables identifying missed DL assignments as well as providing the correct HARQ-ACK to UL (PUCCH/PUSCH) resource mapping. However, if the DL assignment of the last scheduled carrier is missed, the total number of scheduled carriers is incorrectly determined and correspondingly, the HARQ-ACK container size is chosen incorrectly in the case of just a single missed DL assignment.

In an embodiment, a hybrid approach of DAI cycling and indication of the number of scheduled carriers is illustrated in Table 2.

TABLE 2

DAI for hybrid cycling and indication of number of scheduled carriers.

|         | 1st | 2nd | 3rd | 4th | 5th | 6th | 7th | 8th |
|---------|-----|-----|-----|-----|-----|-----|-----|-----|
| 1 cell  | 0   |     |     |     |     |     |     |     |
| 2 cells | 1   | 1   |     |     |     |     |     |     |
| 3 cells | 2   | 1   | 2   |     |     |     |     |     |
| 4 cells | 3   | 1   | 2   | 3   |     |     |     |     |
| 5 cells | 0   | 1   | 2   | 3   | 0   |     |     |     |
| 6 cells | 1   | 1   | 2   | 3   | 0   | 1   |     |     |
| 7 cells | 2   | 1   | 2   | 3   | 0   | 1   | 2   |     |
| 8 cells | 3   | 1   | 2   | 3   | 0   | 1   | 2   | 3   |

In the exemplary situation of Table 2, DAI of the scheduled carrier with the lowest index depends on the total number of carriers scheduled in that sub-frame. Thus DAI of the scheduled carrier with lowest index (column marked with "1st" in Table 2) is given by DAI=(number of scheduled carriers−1)modulo4

For the scheduled carrier with a higher index, the linear increase (including modulo) operation from one to the next scheduled carrier with an increasing index (similar to the operation in Table 1, columns marked with "2nd" to "8th" in Table 2) for the m-th scheduled carrier is given by:

DAI($m$)=($m$−1)modulo4

The modulo 4 operation above is due to assuming a 2 bits DAI ($4=2^2$) to be used here. For a number of N DAI bits, the DAI definition may be given as noted below (DAI for the scheduled carrier with the lowest index):

DAI=(number of scheduled carriers−1)modulo($2^N$)

DAI for the scheduled carrier with the m-th lowest index (x>1):

DAI($m$)=($m$−1)modulo($2^N$)

Thereby, DAI of the scheduled with lowest index carrier is giving an indication of the total number of scheduled carriers. Therefore, a single missed DL grant of any scheduled carrier (including the last one) does not have an effect on the HARQ-ACK codebook size. UE only chooses a wrong HARQ-ACK codebook size in case the DL assignments of the scheduled carriers with the lowest and the highest indices are missed at the same time. This event has a much lower probability than the case of a single missed DL assignment. This is specifically the case since the channel conditions on different carriers are expected to be somewhat uncorrelated, and hence the errors in (E)PDCCH DL assignment reception may be uncorrelated too.

The examples shown herein are for illustration purposes only and limited to 8 carriers, but an embodiment is equally applicable for any number of carriers of up to 32 or even more.

Figure 5:
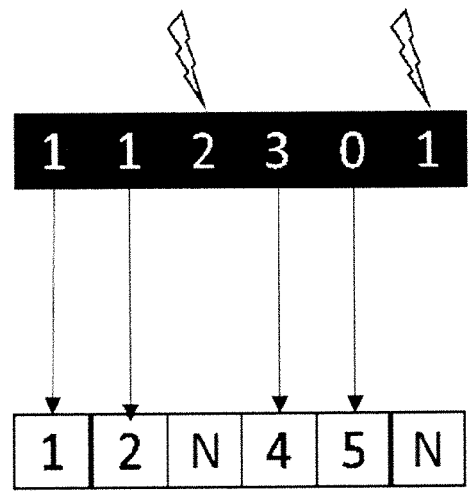
FIGS. 5 and 6 illustrate exemplary error case handling.

For the case of 6 scheduled carriers as shown in FIG. 5 illustrating error case handling for two errors with the proposed hybrid DAI to the scheduled carrier mapping. As can be seen from FIG. 5, the DL assignment of the highest indexed scheduled carrier is missed, and UE is still aware that in total 6 carriers have been scheduled, as DAI of the lowest indexed scheduled carrier indicates the number of scheduled carriers to be x*4+DAI_value+1 (more generically for N DAI bits: x*$2^N$+DAI_value+1), where x is there due to the needed modulo operation. As (a) in total 4 DL grants have been received, and (b) there has been a single cyclic readjustment needed to be done in the cycling part, UE is aware that x=1, and the total number of carriers scheduled is 6. Therefore, UE correctly chooses the HARQ-ACK codebook size according to 6 scheduled carriers. With the available cycling otherwise, UE is able to put ACK/NACKs into the correct position (i.e. DAI of 2 is missing→DL grant has been missed→NACK reported).

This hybrid DAI interpretation may also be applied on top of the carrier grouping (group of N carriers that share the same DAI value) in order to additionally improve the reliability. Exemplary carrier group size of 4 is shown in Table 3 where DAI of the lowest indexed scheduled carrier group indicates 3 scheduled carrier groups ((# scheduled carrier groups−1) modulo 4).

TABLE 3

DAI mapping including carrier grouping.

| cell # | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| DAI    |   | 2 | 2 |   |   |   |   |   | 1 | 1  | 1  |    |    | 2  | 2  |    |

The carrier grouping in addition increases the reliability in case of having more than a single carrier within a carrier group scheduled, as DAIS for each scheduled carrier within a group gets the same value. But independently, again the hybrid DAI mapping of cycling and the first scheduled carrier group (instead of the carrier) in addition indicate the number of scheduled carrier groups (instead of the number of scheduled carriers). Therefore, each identified scheduled carrier group increases the HARQ-ACK container size by the number of bits needed to feed back ACK/NACKs of a whole carrier group (instead of a single carrier without the grouping).

While the examples in the Figures and Tables herein are given for a 2-bit DAI, an embodiment is also applicable for any number of DAI bits (as noted earlier, assuming N DAI bits).

In an embodiment, the same solution for dynamic HARQ-ACK codebook adaptation is applied for both cases: HARQ-ACK transmitted on PUCCH and HARQ-ACK transmitted on PUSCH.

In a first embodiment, in the case of TDD, DAI encoding and codebook size determination is applied separately for each DL sub-frame within the TDD bundling window (i.e. M sub-frames). For example, DAI of the scheduled carrier with the lowest index depends on the total number of carriers scheduled in that sub-frame, while DAI of the other scheduled carriers increases linearly with an increasing index (see Table 4). It is assumed that there are four TDD sub-frames within the TDD bundling window (M=4). The number of scheduled CCs varies between 2 and 6. The HARQ-ACK feedback size is obtained by combining HARQ-ACK corresponding to four consecutive sub-frames→the HARQ-ACK payload size=2 bits+4 bits+6 bits+2 bits=14 bits.

TABLE 4

| DAI | | 1st | 2nd | 3rd | 4th | 5th | 6th |
|---|---|---|---|---|---|---|---|
| Subframe #1 | 2 cells | 1 | 1 | | | | |
| Subframe #2 | 4 cells | 3 | 1 | 2 | 3 | | |
| Subframe #3 | 6 cells | 1 | 1 | 2 | 3 | 0 | 1 |
| Subframe #4 | 2 cells | 1 | 1 | | | | |

In a second embodiment, common DAI encoding is applied for each TDD sub-frame within the TDD bundling window (i.e. M sub-frames), wherein DAI is incremented in a frequency first, time second manner over each scheduled carrier and sub-frame. DAI of the scheduled carrier with the lowest index may indicate the total number of scheduled carriers in that sub-frame (as shown in Table 5A), or the total number of scheduled carriers in that and previous sub-frames of the TDD bundling window (as shown in Table 5B). The DAI indication may also be combination of both; the DAI indication of the scheduled carrier with the lowest index in a sub-frame may indicate the total number of scheduled carriers in that sub-frame, except in the last sub-frame of the TDD bundling window, it indicates the total number of scheduled carriers in all sub-frames of the TDD bundling window (not shown in the Tables/Figures).

For example, there may be four TDD sub-frames within the TDD bundling window (M=4), the number of scheduled CCs varies between 2 and 4. In Table 5A, DAI of the scheduled carrier with the lowest index depends on the total number of carriers scheduled in that sub-frame. In Table 5B, DAI of the scheduled carrier with the lowest index depends on the total number of carriers scheduled in that and previous sub-frames of the TDD bundling window. For both (Table 5A and 5B), the HARQ-ACK feedback size is obtained by combining HARQ-ACK corresponding to four consecutive sub-frames→the HARQ-ACK payload size=2 bits+4 bits+6 bits+2 bits=14 bits.

TABLE 5A

| DAI | | 1st | 2nd | 3rd | 4th | 5th | 6th |
|---|---|---|---|---|---|---|---|
| Subframe #1 | 2 cells | 1 | 1 | | | | |
| Subframe #2 | 4 cells | 3 | 3 | 0 | 1 | | |
| Subframe #3 | 6 cells | 1 | 3 | 0 | 1 | 2 | 3 |
| Subframe #4 | 2 cells | 1 | 1 | | | | |

TABLE 5B

| DAI | | 1st | 2nd | 3rd | 4th | 5th | 6th |
|---|---|---|---|---|---|---|---|
| Subframe #1 | 2 cells | 1 | 1 | | | | |
| Subframe #2 | 4 cells | 1 | 3 | 0 | 1 | | |
| Subframe #3 | 6 cells | 3 | 3 | 0 | 1 | 2 | 3 |
| Subframe #4 | 2 cells | 1 | 1 | | | | | eNB and UE may use different codebook sizes if the DL assignments of the scheduled carriers with the lowest and the highest indices are missed at the same time.

However, to increase robustness, it may be desired that even a lower error probability is supported. Thus in an embodiment, an indication of the number of scheduled carriers uses L DAIS. For example, DAI of the scheduled carrier with the L lowest indexes depend on the total number of carriers scheduled in that sub-frame (or alternatively in the TDD case, in that and previous sub-frames of the TDD bundling window). Thus the downlink assignment index of the scheduled carrier having a carrier index from the lowest carrier index to the L'th lowest carrier index, depends on a total number of scheduled carriers, wherein L is a predetermined ordinal number of the carrier index. The predetermined ordinal number L may be given by a specification (i.e. fixed), or it may be configured at a higher layer by the network to the terminal device. This is illustrated in Table 6 where DAI of the scheduled carrier with the 2 lowest indexes (columns marked with "1st" and "2nd") depend on the total number of carriers scheduled in that sub-frame.

TABLE 6

| | 1st | 2nd | 3rd | 4th | 5th | 6th | 7th | 8th |
|---|---|---|---|---|---|---|---|---|
| 1 cell | 0 | | | | | | | |
| 2 cells | 1 | 1 | | | | | | |
| 3 cells | 2 | 2 | 2 | | | | | |
| 4 cells | 3 | 3 | 2 | 3 | | | | |
| 5 cells | 0 | 0 | 2 | 3 | 0 | | | |
| 6 cells | 1 | 1 | 2 | 3 | 0 | 1 | | |
| 7 cells | 2 | 2 | 2 | 3 | 0 | 1 | 2 | |
| 8 cells | 3 | 3 | 2 | 3 | 0 | 1 | 2 | 3 |

Figure 6:
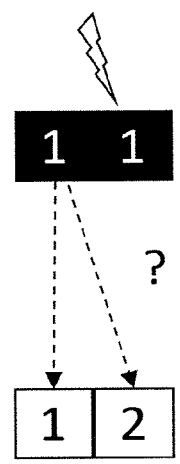

A special error case may be faced when UE is scheduled on more than 1 carrier but at most on L+1 carriers. An example of this is illustrated in FIG. 6 where UE is scheduled on two carriers and DAI value of 1 for the carrier with the lowest index indicates the total number of the scheduled carriers in that sub-frame to be 2 (L=1). At the same time, the DL grant of the second scheduled DL carrier contains a DAI value of 1 as well. Here, if UE misses one DL assignment, UE knows that it needs to report two HARQ-ACK bits based on the received DAI value of 1, but it does not know the right position for the HARQ-ACK bit that it is able to report. In such an error case, UE reports NACK for each carrier.

Alternatively, the use of the codebook size adaptation mechanism, based on the use of DAI (or L DAIS) to indicate the total number of scheduled carriers, may be limited to be used only with certain (large) PUCCH formats (possibly indicated by ARI). Alternatively, the codebook size adaptation mechanism may be limited to be used only when a sufficiently large number of carriers is scheduled in that sub-frame (this is not directly applicable to the TDD case where DAI indicates the total number of scheduled carriers in that and previous sub-frames of the TDD bundling window). For example, UE may be configured with a threshold K on the number of scheduled carriers. If UE detects less than K DL assignments, UE assumes that none of DAIs indicates the total number of scheduled carriers. Instead UE reports a predetermined number of HARQ-ACK bit(s) for that sub-frame (e.g. HARQ-ACK bit(s) for K carriers). If UE detects at least K DL assignments, UE assumes that DAI indicates the total number of scheduled carriers for that sub-frame, and adjusts the codebook size accordingly.

In case of operating with carrier groups, DAI is carrier group specific (instead of carrier specific). The carrier groups are configured by eNB for UE (eNB determines and transmits the carrier group configuration, UE receives the carrier group configuration), and the HARQ-ACK codebook size is defined by the number of carriers within the scheduled carrier groups (instead of the number of scheduled carriers).

The dynamic HARQ-ACK codebook adaptation may be applied in both TDD and FDD. An embodiment enables enhancing the robustness against (E)PDCCH DL assignment failure. The cyclic increase in the DAI value decreases the probability of failed DL assignment detection and correspondingly reduces the chances of erroneous HARQ-ACK codebook determination (except for the last scheduled carrier/carrier group). The DAI value definition for the scheduled carrier with the lowest cell index in addition provides improved robustness related to the last scheduled carrier/carrier group. The solution is compatible with DAI/ARI framework, does not require predictive scheduler operation, is applicable for HARQ-ACK carried both on PUCCH and PUSCH. Efficient UCI resource usage is facilitated, and various eNB scheduler strategies are supported. The special case when only PCell is scheduled includes the TDD DAI operation providing inherent robustness during e.g. CC (re-)configuration.

The HARQ-ACK payload size may be dynamically adjusted on a per need basis to minimize the PUCCH overhead and uplink control information (UCI) overhead on PUSCH due to the HARQ-ACK payload. A PUCCH format for the HARQ-CK feedback may be dynamically selected with use of ARI. The dynamical PUCCH format selection may be used to transform the reduction in the HARQ-ACK feedback into reduction in the PUCCH overhead.

Thus the dynamic HARQ-ACK codebook size adaptation as part of the LTE Rel-13 carrier aggregation enhancements may be made robust against signalling errors. Additional complexity (at both UE and eNB sides) and the need for additional signalling in DL side may be minimized. The dynamic HARQ-ACK codebook size adaptation may be made available for both PUSCH and PUCCH. Support for up to 32 component carriers, support for both FDD and TDD frame structures, and support for efficient PUCCH resource usage may be provided. Efficient operation also with a larger number of configured carriers and a smaller number of scheduled carriers may be provided. Robust operation may be assured during RRC configuration of the carrier aggregation feature.

In an embodiment, the UL grant and/or the DL control information is carried on the physical downlink control channel or on the enhanced physical downlink control channel.

In an embodiment, the downlink assignment index is defined for frequency division duplex and/or time division duplex.

In an embodiment, the downlink assignment comprises at least one of a physical downlink control channel downlink assignment and an enhanced physical downlink control channel downlink assignment.

In an embodiment, the downlink assignment further comprises an ACK/NACK resource index.

In an embodiment, the downlink assignment index is defined for one or more of frequency division duplex and time division duplex, wherein in the case of time division duplex, the downlink assignment index of the scheduled carrier having at least the lowest carrier index from the list of configured downlink carriers, is based on the total number of scheduled carriers in a sub-frame.

In an embodiment, it is defined that
DAI=(number of scheduled carriers−1)modulo($2^N$)
wherein
DAI is the downlink assignment index of the scheduled carrier having at least the lowest carrier index, and
N is the number of downlink assignment index bits.

In an embodiment, it is defined that
DAI($m$)=($m$−1)modulo($2^N$)
wherein
DAI(m) is the downlink assignment index of a scheduled carrier having a carrier index higher than the lowest carrier index,
m is the carrier index, and
N is the number of downlink assignment index bits.

In an embodiment, the carrier index order is obtained based on a serving cell index configuration or other higher layer cell order configuration.

In an embodiment, the HARQ-ACK codebook size is determined based on at least one of an ACK/NACK resource index, and the downlink assignment index of the scheduled carrier, and the downlink assignment index of the scheduled carrier having at least the lowest carrier index from the list of configured downlink carriers, and the number of scheduled carriers.

In an embodiment, the carrier indexes are obtained by ranking the scheduled carriers according to their respective serving cell index.

In an embodiment, the number of scheduled carriers is determined based on the downlink assignment index of the scheduled carrier having at least the lowest carrier index from a list of configured downlink carriers.

In an embodiment, the resources for conveying a HARQ-ACK message are determined based on an ACK/NACK resource index.

In an embodiment, carrier grouping is applied such that the downlink assignment index of the scheduled carrier group having at least the lowest carrier group index from a list of configured carrier groups is defined based on a total number of scheduled carrier groups; and the downlink assignment index of scheduled carrier groups having a higher carrier group index from the list of configured carrier groups is defined based on a linear incrementing operation from one scheduled carrier group to the next in an increasing carrier group index order.

In an embodiment, HARQ-ACK messages are provided for the carrier group.

In an embodiment, the downlink assignment index is defined for one or more of frequency division duplex and time division duplex, wherein in the case of time division duplex, common downlink assignment index encoding is applied for each time division duplex sub-frame within the scheduling window, wherein the downlink assignment index is incremented in frequency first, time second manner over each scheduled carrier and sub-frame, and wherein the downlink assignment index of the scheduled carrier with at least the lowest carrier index from the list of configured downlink carriers in a sub-frame indicates the number of scheduled carriers in said sub-frame; the downlink assignment index of the scheduled carrier with at least the lowest carrier index from the list of configured downlink carriers in a sub-frame indicates the total number of scheduled carriers in said sub-frame and previous sub-frames of the scheduling window; or the downlink assignment index of the scheduled carrier with at least the lowest carrier index from the list of configured downlink carriers in a sub-frame indicates the total number of scheduled carriers in the selected sub-frame, except that in the last sub-frame of the scheduling window, the downlink assignment index indicates the total number of scheduled carriers in each sub-frame of the scheduling window.

In an embodiment, the downlink assignment index of the scheduled carrier having a carrier index from the lowest carrier index to the L'th lowest carrier index, depends on a total number of scheduled carriers, wherein L is a predetermined ordinal number of the carrier index.

In an embodiment, if less than a predetermined threshold number of downlink assignments are detected in the terminal device, it is assumed that none of downlink assignment indexes indicates the total number of scheduled carriers, and a predetermined number of HARQ-ACK bits are reported to the network node for the sub-frame; and if at least a predetermined threshold number of downlink assignments are detected in the terminal device, it is assumed that the downlink assignment index indicates the total number of scheduled carriers for the sub-frame, and the HARQ-ACK codebook size is adjusted accordingly.

In an embodiment, the method comprises receiving, in the network node from the terminal device, a HARQ-ACK feedback message assuming a predetermined number of HARQ-ACK bits for the sub-frame, if less than a predetermined threshold number of downlink assignments have been sent to the terminal device.

Figure 7:
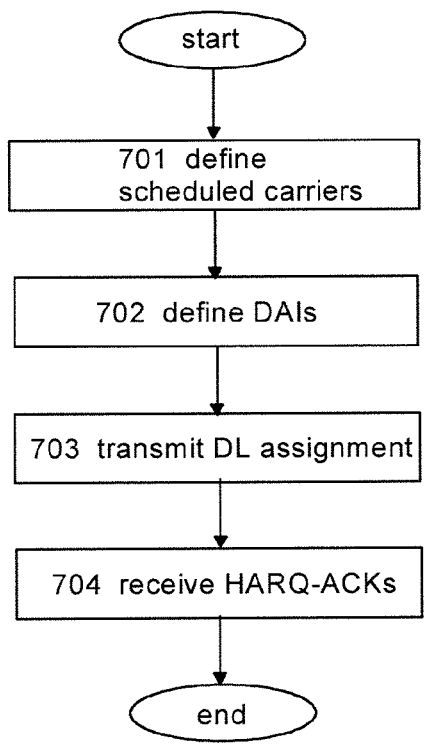
FIGS. 7 and 8 illustrate processes for downlink assignment and HARQ-ACK feedback according to some embodiments of the invention.
Figure 8:
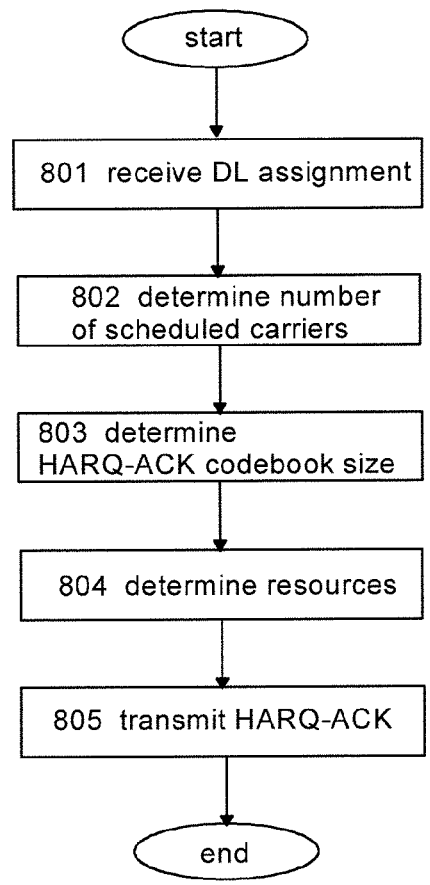

Let us now describe some embodiments with reference to FIGS. 7 and 8.

Referring to FIG. 7, the network node (such as eNB) may define (block 701) scheduled downlink carriers from a list of configured downlink carriers. The network node further defines (block 702) a downlink assignment index of the scheduled carrier having at least the lowest carrier index from the list of configured DL carriers, based on a total number of scheduled carriers. The network node also defines (block 702) the downlink assignment index for each other scheduled carrier having a higher carrier index from the list of configured DL carriers. Based on the defining, for each scheduled carrier, the network node causes transmission to the terminal device of a control message (block 703) corresponding to each scheduled carrier, the control message indicating a physical downlink control channel (or enhanced physical downlink control channel) downlink assignment scheduling a physical downlink shared channel, and comprising at least one information element indicating the defined downlink assignment index. At the same time, for each scheduled carrier, the network node also causes transmission (block 703) of information on the physical downlink shared channel. The network node receives (block 704), from the terminal device, uplink control signalling indicating HARQ-ACKs related to the physical downlink shared channels corresponding to the scheduled carriers.

Referring to FIG. 8, the terminal device may receive (block 801) from the network node, the physical downlink control channel (or enhanced physical downlink control channel) downlink assignment/assignments, each scheduling a physical downlink shared channel. Responsive to the receiving, the terminal device determines (block 802) the number of scheduled carriers based on the downlink assignment indexes of the received downlink assignments. The terminal device also determines (block 804) a HARQ-ACK codebook size based on the determined number of scheduled carriers. The terminal device further determines (block 804) resources for conveying a HARQ-ACK message. Based on the determining, the terminal device causes (block 805) transmission of a control message to the network node, the control message comprising at least one information element indicating HARQ-ACKs related to the physical downlink shared channels corresponding to the scheduled carriers.

Figure 9:
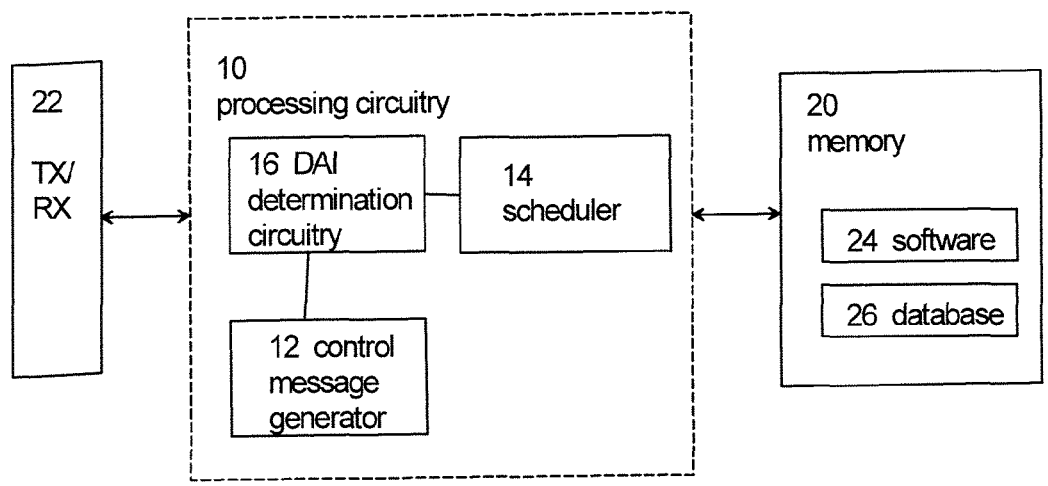
FIGS. 9 and 10 illustrate blocks diagrams of apparatuses according to some embodiments of the invention.

An embodiment provides an apparatus comprising at least one processor and at least one memory including a computer program code, wherein the at least one memory and the computer program code are configured, with the at least one processor, to cause the apparatus to carry out the procedures of the above-described base station or the network node. The at least one processor, the at least one memory, and the computer program code may thus be considered as an embodiment of means for executing the above-described procedures of the base station or the network node. FIG. 9 illustrates a block diagram of a structure of such an apparatus. The apparatus may be comprised in the base station or the network node, e.g. the apparatus may form a chipset or a circuitry in the base station or the network node. In some embodiments, the apparatus is the base station or the network node. The apparatus comprises a processing circuitry 10 comprising the at least one processor. The processing circuitry 10 may comprise a scheduler 14 configured to define scheduled downlink carriers from a list of configured downlink carriers, and a DAI determination circuitry 16 configured to define a downlink assignment index of the scheduled carrier having at least the lowest carrier index from the list of configured DL carriers, based on a total number of scheduled carriers. The DAI determination circuitry is also configured to define the downlink assignment index for each other scheduled carrier having a higher carrier index from the list of configured DL carriers. The processing circuitry 10 may further comprise a control message generator 12 configured to, based on the defining, for each scheduled carrier, cause transmission to the terminal device of a control message corresponding to each scheduled carrier, the control message indicating a physical downlink control channel (or enhanced physical downlink control channel) downlink assignment scheduling a physical downlink shared channel, and comprising at least one information element indicating the defined downlink assignment index. At the same time, for each scheduled carrier, the control message generator 12 may be configured to cause transmission of information on the physical downlink shared channel. The processing circuitry 10 may further comprise a communication controller circuitry (not shown in FIG. 9) configured to receive, from the terminal device, uplink control signalling indicating HARQ-ACKs related to the physical downlink shared channels corresponding to the scheduled carriers.

The processing circuitry 10 may comprise the circuitries 12 to 16 as sub-circuitries, or they may be considered as computer program modules executed by the same physical processing circuitry. The memory 20 may store one or more computer program products 24 comprising program instructions that specify the operation of the circuitries 12 to 16. The memory 20 may further store a database comprising definitions for the downlink assignment, for example. The apparatus may further comprise a communication interface 22 providing the apparatus with radio communication capability with the terminal devices. The communication interface 22 may comprise a radio communication circuitry enabling wireless communications and comprise a radio frequency signal processing circuitry and a baseband signal processing circuitry. The baseband signal processing circuitry may be configured to carry out the functions of the transmitter and/or the receiver, as described above in connection with FIGS. 2 to 8. In some embodiments, the communication interface may be connected to a remote radio head comprising at least an antenna and, in some embodiments, radio frequency signal processing in a remote location with respect to the base station. In such embodiments, the communication interface 22 may carry out only some of radio frequency signal processing or no radio frequency signal processing at all. The connection between the communication interface 22 and the remote radio head may be an analogue connection or a digital connection.

Figure 10:
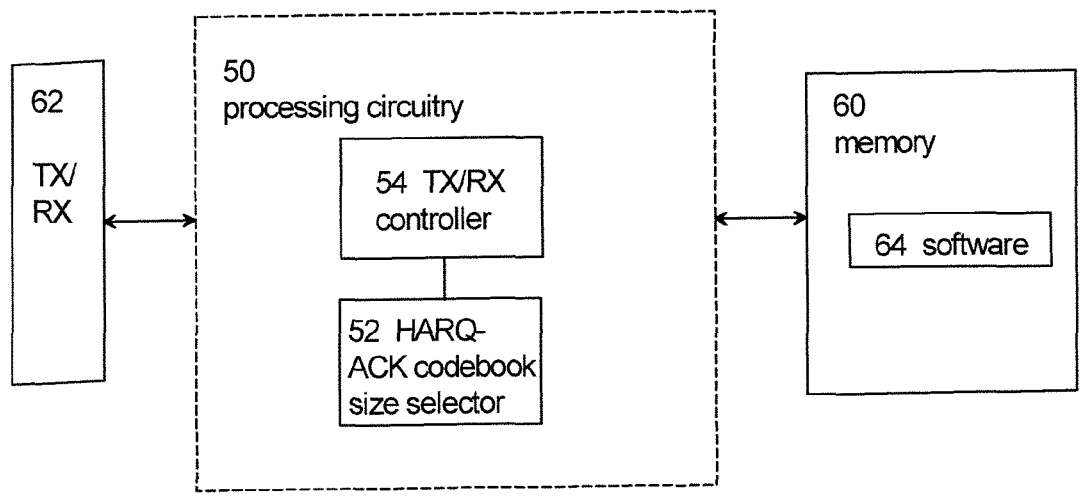

An embodiment provides another apparatus comprising at least one processor and at least one memory including a computer program code, wherein the at least one memory and the computer program code are configured, with the at least one processor, to cause the apparatus to carry out the procedures of the above-described terminal device. The at least one processor, the at least one memory, and the computer program code may thus be considered as an embodiment of means for executing the above-described procedures of the terminal device. FIG. 10 illustrates a block diagram of a structure of such an apparatus. The apparatus may be comprised in the terminal device, e.g. it may form a chipset or a circuitry in the terminal device. In some embodiments, the apparatus is the terminal device. The apparatus comprises a processing circuitry 50 comprising the at least one processor. The processing circuitry 50 may comprise a communication controller circuitry 54 configured to receive from the network node, the physical downlink control channel (or enhanced physical downlink control channel) downlink assignment/assignments, each scheduling a physical downlink shared channel. The processing circuitry 50 may further comprise a HARQ-ACK codebook size selector 52 configured to, responsive to the receiving, determine the number of scheduled carriers based on the downlink assignment indexes of the received downlink assignments. The HARQ-ACK codebook size selector 52 may further be configured to determine a HARQ-ACK codebook size based on the determined number of scheduled carriers. The HARQ-ACK codebook size selector 52 may further be configured to determine resources for conveying a HARQ-ACK message. The communication controller circuitry 54 may further be configured to, based on the determining, cause transmission of a control message to the network node, the control message comprising at least one information element indicating HARQ-ACKs related to the physical downlink shared channels corresponding to the scheduled carriers.

The processing circuitry 50 may comprise the circuitries 52, 54 as sub-circuitries, or they may be considered as computer program modules executed by the same physical processing circuitry. The memory 60 may store one or more computer program products 64 comprising program instructions that specify the operation of the circuitries 52, 54. The apparatus may further comprise a communication interface 62 providing the apparatus with radio communication capability with base stations of one or more cellular communication networks. The communication interface 62 may comprise a radio communication circuitry enabling wireless communications and comprise a radio frequency signal processing circuitry and a baseband signal processing circuitry. The baseband signal processing circuitry may be configured to carry out the functions of the transmitter and/or the receiver, as described above in connection with FIGS. 2 to 8.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 10 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP third generation partnership program
ACK acknowledgement
ARI ACK/NACK resource index
CA carrier aggregation
CC component carrier
CQI channel quality indicator
CRC cyclic redundancy check
CRS common reference signal
CSI-RS channel state information reference signal
CSS common search space
DAI downlink assignment index
DCI downlink control information
DL downlink
DTX discontinuous transmission DwPTS downlink pilot time slot
eIMTA enhanced interference mitigation and traffic adaptation
eNB enhanced node-B, base station
EPDCCH enhanced PDCCH
ETSI European telecommunications standards institute
FFP fixed frame period
HARQ hybrid automatic repeat request
ISM industrial, scientific and medical
L1 layer-1, physical layer
LAA licensed assisted access
LTE long term evolution
MBMS multimedia broadcast/multicast service
NACK negative acknowledgement
PCell primary cell
PDCCH physical downlink control channel
PMCH physical multicast channel
PMI precoding matrix indicator
PUCCH physical uplink control channel
PUSCH physical uplink shared channel
RAN radio access network
Rel release
RI rank indicator
SCell secondary cell
TB transport block
TD time division
TDD time division duplex
UCI uplink control information
UL uplink
USS user-specific search space
Wi-Fi wireless fidelity
WLAN wireless local area network

The invention claimed is:

1. An apparatus comprising
at least one processor; and
at least one memory including a computer program code, wherein the at least one memory and the computer program code are configured, with the at least one processor, to cause the apparatus to
define scheduled downlink carriers from a list of configured downlink carriers;
define a downlink assignment index of a scheduled carrier having at least the lowest carrier index from the list of configured downlink carriers, based on a total number of scheduled carriers;
define the downlink assignment index for each other scheduled carrier of the rest of the scheduled downlink carriers having a higher carrier index from the list of configured downlink carriers;
based on the defining, cause transmission of a control message to a terminal device, the control message corresponding to each scheduled carrier, the control message indicating a downlink assignment scheduling a physical downlink shared channel, and comprising at least one information element indicating the defined downlink assignment index;
receive, from the terminal device, uplink control signalling indicating HARQ-ACKs related to physical downlink shared channels corresponding to the scheduled carriers;
wherein it is defined that $$DAI=(\text{number of scheduled carriers}-1)\operatorname{modulo}(2^N)$$

wherein DAI is the downlink assignment index of the scheduled carrier having at least the lowest carrier index, and
N is the number of downlink assignment index bits;
or wherein it is defined that $$DAI(m)=(m-1)\operatorname{modulo}(2^N)$$

wherein DAI(m) is the downlink assignment index of a scheduled carrier having a carrier index higher than the lowest carrier index,
m is the carrier index, and
N is the number of downlink assignment index bits.

2. The apparatus of claim 1, wherein the downlink assignment index is defined for one or more of frequency division duplex and time division duplex, wherein in the case of frequency division duplex, the downlink assignment index of the scheduled carrier having at least the lowest carrier index from the list of configured downlink carriers in a sub-frame indicates the total number of scheduled carriers in the sub-frame.

3. The apparatus of claim 1, wherein the downlink assignment index is defined for one or more of frequency division duplex and time division duplex, wherein in the case of time division duplex, common downlink assignment index encoding is applied for each time division duplex sub-frame within the scheduling window, wherein the downlink assignment index is incremented in frequency first, time second manner over each scheduled carrier and sub-frame, and wherein
the downlink assignment index of the scheduled carrier with at least the lowest carrier index from the list of configured downlink carriers in a sub-frame indicates the number of scheduled carriers in said sub-frame;
the downlink assignment index of the scheduled carrier with at least the lowest carrier index from the list of configured downlink carriers in a sub-frame indicates the total number of scheduled carriers in said sub-frame and previous sub-frames of the scheduling window; or
the downlink assignment index of the scheduled carrier with at least the lowest carrier index from the list of configured downlink carriers in a sub-frame indicates the total number of scheduled carriers in the selected sub-frame, except that in the last sub-frame of the scheduling window, the downlink assignment index indicates the total number of scheduled carriers in each sub-frame of the scheduling window.

4. The apparatus of claim 1, wherein the carrier index order is obtained based on a serving cell index configuration or other higher layer cell order configuration.

5. The apparatus of claim 1, wherein a HARQ-ACK codebook size is determined based on at least one of
an ACK/NACK resource index, or
the downlink assignment index of the scheduled carrier and the downlink assignment index of the scheduled carrier having at least the lowest carrier index from the list of configured downlink carriers and, the number of scheduled carriers.

6. The apparatus of claim 1, wherein the carrier indexes are obtained by ranking the scheduled carriers according to their respective serving cell index.

7. The apparatus of claim 1, wherein at least one of:
the downlink assignment index of the scheduled carrier group having at least the lowest carrier group index from a list of configured carrier groups is defined based on a total number of scheduled carrier groups; and the downlink assignment index of scheduled carrier groups having a higher carrier group index from the list of configured carrier groups is defined based on a linear incrementing operation from one scheduled carrier group to the next in an increasing carrier group index order; or the downlink assignment index of the scheduled carrier having a carrier index from the lowest carrier index to the L'th lowest carrier index, depends on a total number of scheduled carriers, wherein L is a predetermined ordinal number of the carrier index.

8. The apparatus of claim 1, wherein the at least one memory and the computer program code are further configured, with the at least one processor, to cause the apparatus to:
receive, in the network node from the terminal device, a HARQ-ACK feedback message assuming a predetermined number of HARQ-ACK bits for the sub-frame, if less than a predetermined threshold number of downlink assignments have been sent to the terminal device.

9. An apparatus comprising
at least one processor; and
at least one memory including a computer program code, wherein the at least one memory and the computer program code are configured, with the at least one processor, to cause the apparatus to
receive, from a network node, a downlink assignment scheduling a physical downlink shared channel, and downlink assignment indexes of scheduled carriers;
responsive to the receiving, determine the number of scheduled carriers based on the downlink assignment indexes of the received downlink assignments;
determine a HARQ-ACK codebook size;
determine resources for conveying a HARQ-ACK message;
based on the determining of the number of scheduled carriers, the HARQ-ACK codebook size, and the resources for conveying the HARQ-ACK message, cause transmission of a control message to the network node, the control message comprising at least one information element indicating HARQ-ACKs related to physical downlink shared channels corresponding to the determined number of scheduled carriers;
wherein it is defined that $$DAI=(\text{number of scheduled carriers}-1)\text{modulo}(2^N)$$

wherein
DAI is the downlink assignment index of the scheduled carrier having at least the lowest carrier index, and
N is the number of downlink assignment index bits;
or wherein it is defined that $$DAI(m)=(m-1)\text{modulo}(2^N)$$

wherein DAI(m) is the downlink assignment index of a scheduled carrier having a carrier index higher than the lowest carrier index,
m is the carrier index, and
N is the number of downlink assignment index bits.

10. The apparatus of claim 9, wherein the downlink assignment index is defined for one or more of frequency division duplex and time division duplex, wherein in the case of frequency division duplex, the downlink assignment index of the scheduled carrier having at least the lowest carrier index from the list of configured downlink carriers in a sub-frame indicates the total number of scheduled carriers in the sub-frame.

11. The apparatus of claim 9, wherein the downlink assignment index is defined for one or more of frequency division duplex and time division duplex, wherein in the case of time division duplex, common downlink assignment index encoding is applied for each time division duplex sub-frame within the scheduling window, wherein the downlink assignment index is incremented in frequency first, time second manner over each scheduled carrier and sub-frame, and wherein
the downlink assignment index of the scheduled carrier with at least the lowest carrier index from the list of configured downlink carriers in a sub-frame indicates the number of scheduled carriers in said sub-frame;
the downlink assignment index of the scheduled carrier with at least the lowest carrier index from the list of configured downlink carriers in a sub-frame indicates the total number of scheduled carriers in said sub-frame and previous sub-frames of the scheduling window; or
the downlink assignment index of the scheduled carrier with at least the lowest carrier index from the list of configured downlink carriers in a sub-frame indicates the total number of scheduled carriers in the selected sub-frame, except that in the last sub-frame of the scheduling window, the downlink assignment index indicates the total number of scheduled carriers in each sub-frame of the scheduling window.

12. The apparatus of claim 9, wherein the carrier index order is obtained based on a serving cell index configuration or other higher layer cell order configuration.

13. The apparatus of claim 9, wherein a HARQ-ACK codebook size is determined based on at least one of
an ACK/NACK resource index, or
the downlink assignment index of the scheduled carrier or
the downlink assignment index of the scheduled carrier having at least the lowest carrier index from the list of configured downlink carriers or,
the number of scheduled carriers.

14. The apparatus of claim 9, wherein the carrier indexes are obtained by ranking the scheduled carriers according to their respective serving cell index.

15. The apparatus of claim 9, wherein the number of scheduled carriers is determined based on the downlink assignment index of the scheduled carrier having at least the lowest carrier index from a list of configured downlink carriers.

16. The apparatus of claim 9, wherein at least one of:
the downlink assignment index of the scheduled carrier group having at least the lowest carrier group index from a list of configured carrier groups is defined based on a total number of scheduled carrier groups; the downlink assignment index of scheduled carrier groups having a higher carrier group index from the list of configured carrier groups is defined based on a linear incrementing operation from one scheduled carrier group to the next in an increasing carrier group index order; or
the downlink assignment index of the scheduled carrier having a carrier index from the lowest carrier index to the L'th lowest carrier index, depends on a total number of scheduled carriers, wherein L is a predetermined ordinal number of the carrier index.

17. The apparatus of claim 9, wherein
if less than a predetermined threshold number of downlink assignments are detected in the terminal device, it is assumed that none of downlink assignment indexes indicates the total number of scheduled carriers, and a predetermined number of HARQ-ACK bits are reported to the network node for the sub-frame; and
if at least a predetermined threshold number of downlink assignments are detected in the terminal device, it is assumed that the downlink assignment index indicates the total number of scheduled carriers for the subframe, and the HARQ-ACK codebook size is adjusted accordingly.

18. A method comprising receiving, in a terminal device from a network node, a downlink assignment scheduling a physical downlink shared channel, and downlink assignment indexes of scheduled carriers;

responsive to the receiving, determining, in the terminal device, the number of scheduled carriers based on the downlink assignment indexes of the received downlink assignments;

determining, in the terminal device, a HARQ-ACK codebook size;

determining, in the terminal device, resources for conveying a HARQ-ACK message;

based on the determining of the number of scheduled carriers, the HARQ-ACK codebook size, and the resources for conveying the HARQ-ACK message, causing, in the terminal device, transmission of a control message to the network node, the control message comprising at least one information element indicating HARQ-ACKs related to physical downlink shared channels corresponding to the determined number of scheduled carriers;

wherein it is defined that $$DAI=(\text{number of scheduled carriers}-1)\text{modulo}(2^N)$$

wherein

DAI is the downlink assignment index of the scheduled carrier having at least the lowest carrier index, and N is the number of downlink assignment index bits;

or wherein it is defined that $$DAI(m)=(m-1)\text{modulo}(2^N)$$

wherein DAI(m) is the downlink assignment index of a scheduled carrier having a carrier index higher than the lowest carrier index, m is the carrier index, and N is the number of downlink assignment index bits.

\* \* \* \* \*